T. A. EDISON.
Automatic Telegraph Instruments.
No. 134,867.
Patented Jan. 14, 1873.
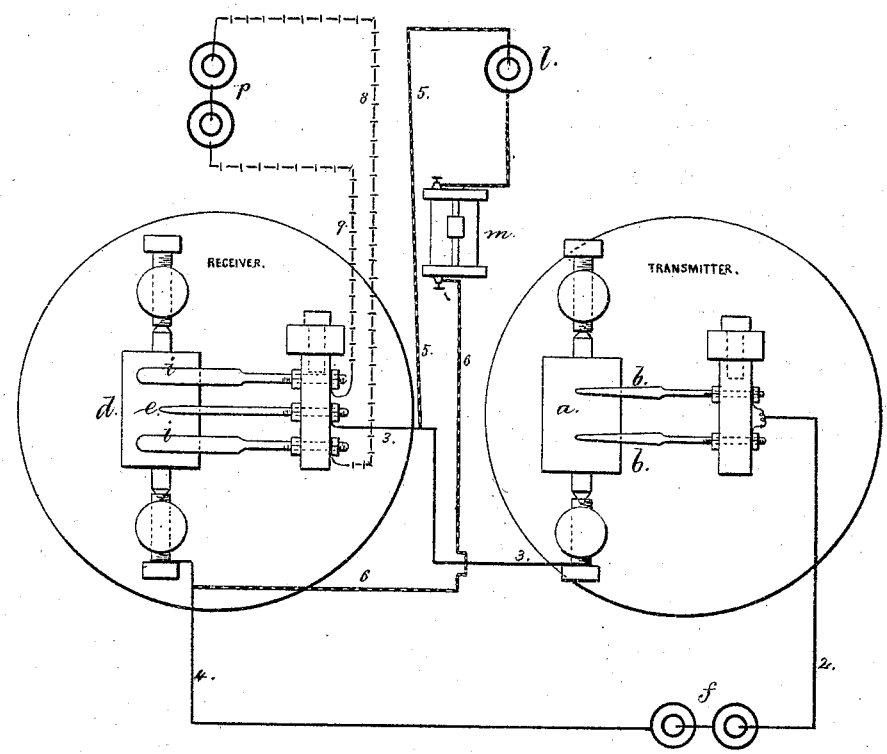

UNITED STATES PATENT OFFICE

THOMAS A. EDISON, OF NEWARK, NEW JERSEY, ASSIGNOR TO HIMSELF AND GEORGE HARRINGTON, OF WASHINGTON, D. C.

IMPROVEMENT IN AUTOMATIC TELEGRAPH INSTRUMENTS.

Specification forming part of Letters Patent No. 134,867, dated January 14, 1873.

*To all whom it may concern:*

Be it known that I, THOMAS A. EDISON, of Newark, in the county of Essex and State of New Jersey, have invented an Improvement in Chemical Telegraphs; and the following is declared to be a correct description of the same.

In chemical telegraphs difficulty arises in preventing the earth currents marking the paper and interfering with the sharpness of the dot and dash marks.

In my present invention I neutralize the earth currents, and also prevent the stylus being destroyed by the action of the acid in the chemical paper while the circuit is broken on the main line or the instrument is not in action.

I employ a rheostat to regulate the action of a battery that supplies a very feeble constant current to neutralize earth currents, and a local constant current is brought into contact with the surface of the chemical paper to pass across the paper near the stylus and prevent, by polarizing such paper, the action of the acids upon the iron stylus or pen, thereby preventing injury to the same during the time that the instrument is not in use.

The diagram in annexed drawing illustrates this invention.

The transmitting-roller $a$ is mounted and rotated in any usual manner, and $b\ b$ represent the transmitting stylus, brush, or spring roller or rollers. The receiving-roller $d$ is propelled in any convenient manner, and the paper is drawn along in the ordinary way. The stylus $e$ or marker is of iron or other material to make a mark upon the chemical paper when the electric current passes through such paper. The spring-conductors $i\ i$ are of platinum, and rest upon the chemical paper at each side of the stylus $e$. The main battery $f$ is connected, through the wire 2, stylus $b$, roller $a$, line-wire 3, to the stylus $e$; thence by the wire 4 or earth connection, so as to mark the paper as usual. The battery $l$ is connected to the rheostat $m$, and by the wire 5 to the line 3 and the wire 6 to the earth line 4, so that a very feeble current, adjustable by $m$, is thrown on the line and earth connections in the reverse direction to the earth currents, so as to neutralize the same. The battery $p$ is connected by the wires 8 and 9 with the spring-conductors $i\ i$ so that a current will pass across the chemical paper resting upon the roller $d$. The main-line current from the stylus gives to the particles an electric condition; that condition continuing tends to prolong the mark after the pulsation ceases; the cross or counter current neutralizes this electric condition or polarity, and prevents attenuation of the mark; it also prevents injury to the stylus or pen by the action of the acids in the paper, because the current passing between the conductors $i\ i$ is superior to any ground currents and neutralizes their action.

I claim as my invention—

1. The circuit from the battery $l$ connected with the earth and line in a chemical telegraph instrument and adjusted by the rheostat $m$ to neutralize earth currents, substantially as set forth.

2. The conductors $i\ i$ connected with the battery $p$, in combination with the stylus $e$ of a chemical receiving instrument, for the purposes and substantially as set forth.

Signed by me this 8th day of May, A. D. 1872.

T. A. EDISON.

Witnesses:
 GEO. T. PINCKNEY,
 CHAS. H. SMITH.